United States Patent [19]
Junker et al.

[11] Patent Number: 5,089,127
[45] Date of Patent: Feb. 18, 1992

[54] CHEMICAL FEED APPARATUS

[75] Inventors: David M. Junker, Monroeville; Charles R. Wiedrich, Murrysville; Robert B. Simmons, Jeannette, all of Pa.

[73] Assignee: PPG Industries, Inc., Pittsburgh, Pa.

[21] Appl. No.: 600,461

[22] Filed: Oct. 19, 1990

[51] Int. Cl.$^5$ .............................................. C02F 1/76
[52] U.S. Cl. ................................. 210/206; 422/264; 422/276; 422/277; 422/278; 210/169
[58] Field of Search ............... 210/206, 754, 169, 756, 210/97; 422/264, 274–278

[56] References Cited

U.S. PATENT DOCUMENTS

| | | | |
|---|---|---|---|
| 1,242,905 | 10/1917 | Atkinson | 422/274 |
| 3,107,156 | 10/1963 | Fredericks | 422/264 |
| 3,203,440 | 8/1965 | Schneider, Jr. | 422/264 |
| 3,383,178 | 5/1968 | Dietz | 23/272 |
| 3,426,901 | 2/1969 | Sherper | 210/206 |
| 3,474,817 | 10/1969 | Bates et al. | 210/169 |
| 3,507,624 | 4/1970 | Schneider et al. | 422/264 |
| 3,579,440 | 5/1971 | Bradley, Jr. | 210/206 |
| 3,595,395 | 7/1971 | Lorenzen | 210/169 |
| 3,595,786 | 4/1971 | Horvath et al. | 422/264 B |
| 3,598,536 | 8/1971 | Christensen | 422/274 |
| 3,846,078 | 11/1974 | Brett | 422/264 |
| 3,899,425 | 8/1975 | Lewis | 210/206 |
| 4,063,663 | 12/1977 | Larson et al. | 422/264 |
| 4,210,624 | 7/1980 | Price | 422/264 |
| 4,293,425 | 10/1981 | Price | 210/754 |
| 4,331,174 | 5/1982 | King, Sr. | 422/277 |
| 4,407,322 | 10/1983 | Moore et al. | 422/276 |
| 4,548,228 | 10/1985 | Moore et al. | 422/276 |
| 4,584,106 | 4/1986 | Held | 210/206 |
| 4,732,689 | 3/1988 | Harvey et al. | 210/754 |
| 4,759,907 | 7/1988 | Kawolics et al. | 422/264 |
| 4,790,981 | 12/1988 | Mayer et al. | 422/264 |
| 4,917,868 | 4/1990 | Alexander et al. | 422/276 |

OTHER PUBLICATIONS

Olin Pulsar ®, Olin Chemicals.
S-2 Automatic Cl$_2$ Feeder For In-Ground Pools, by E. Z. Chlor ® Systems.
Pulsar ® II, Olin Water Products and Services Division, Olin Corporation.

Primary Examiner—Ivars Cintins
Assistant Examiner—Cynthia L. Nessler
Attorney, Agent, or Firm—Irwin M. Stein

[57] ABSTRACT

A chemical feeder having a collection reservoir and an erosion reservoir located within and spaced from the wall of the collection reservoir. An elongated cylinder is supported on the collection reservoir and the lower end of the cylinder is located in the collection reservoir. The collection reservoir has a water discharge outlet and the erosion reservoir has a water inlet with a valve to control the flow rate of water into the erosion reservoir. A canister containing solid chemical sanitizing elements is supported in the cylinder and its lower portion is located in the upper portion of the erosion reservoir. Openings are located in the lower end portion of the canister so that solid dry chemical sanitizing elements located in the lower end portion of the canister can be contacted by water in the erosion reservoir to erode and dissolve the solid elements to chemically treat water flowing out of the erosion reservoir into the collection reservoir.

20 Claims, 2 Drawing Sheets

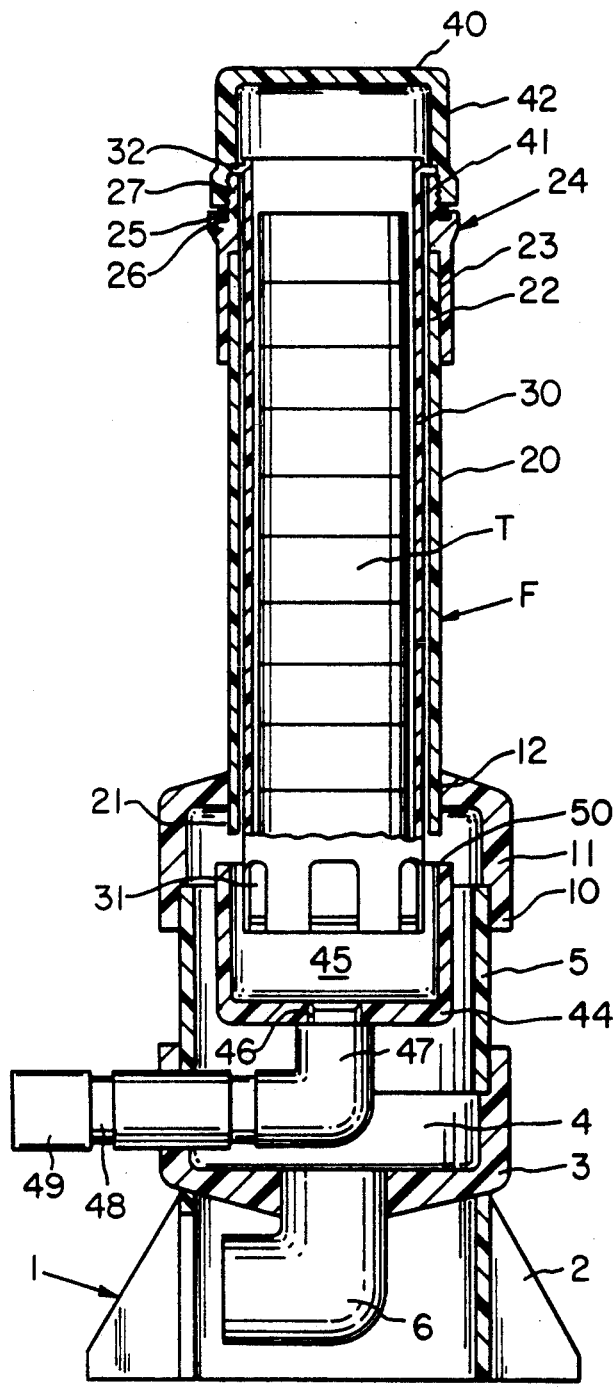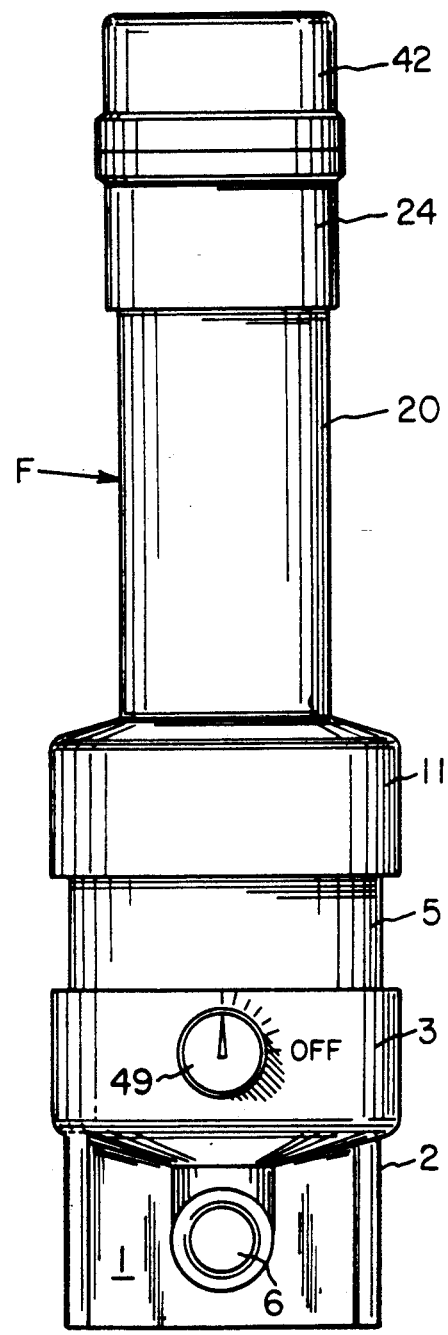

CHEMICAL FEED APPARATUS

BACKGROUND OF THE INVENTION

1. Field of the Invention

The invention is directed generally to a chemical feeder for providing a sanitizing chemical to water and more particularly to a chemical feeder which automatically provides controlled amounts of a sanitizing chemical to water in a circulating system.

2. Description of Related Prior Art

A number of chemical feeders are disclosed in the prior art. Thus, U.S. Pat. No. 4,210,624 discloses a module which is attached to the upper end of a water filter assembly. Water supplied to body 19 through inlet port 39 rises to an unknown level within body 19 and wets an unknown amount of chlorine pellets in the body. It is difficult to accurately control the amount of chlorine supplied to the water in this arrangement because the water level in the module is unknown as is the number of chlorine pellets which will be contacted by the water.

U.S. Pat. No. 3,899,425 discloses an on-line chemical feeder 80 which is attached to a modular filter assembly for water. The feeder utilizes chlorine tablets 98 as the source of chlorine and water flows through the filter into the feeder and wets an unknown number of the tablets in pipe 82 which makes it difficult to control the amount of chlorine supplied to the water.

U.S. Pat. No. 3,383,178 discloses a chemical feeder for supplying chlorine to water but this device involves a relatively complicated arrangement for controlling the flow rate of the water. Hence, the amount of chlorine supplied to the water cannot be accurately controlled.

A commercial swimming pool water chlorinator is described in the brochure entitled "Olin PULSAR ® Pool Feeder System". This chlorinator has the disadvantage that it is difficult to control the amount of chlorine supplied to the swimming pool water because of the cyclical operation of the accumulator and plugging of the orifices in the chemical grid. Additionally, the chlorinator described in this brochure requires adjusting the position of the chemical container to change the amount of chlorine supplied to the swimming pool water.

Another commercially available chlorinator is described in the brochure entitled "PULSAR ® II Commercial Pool Feeder". In this chlorinator, it is difficult to accurately control the amount of chlorine supplied to the swimming pool water because of the cyclical operation of the siphon.

Another commercial chlorinator is described in a brochure entitled "S-2 Automatic Chlorine Feeder For In-Ground Pools". The chlorinator described in this brochure has a constant water level and a constant water flow rate and adjusts the chlorine feed to the swimming pool water by changing the position of the "S-2 Feeder Pac" to vary the level of submergence of the chlorine pellets in the "Feeder Pac". It is difficult to accurately control and maintain the chlorine feed to the swimming pool water with this device.

SUMMARY OF THE INVENTION

The chemical feeder of this invention includes a cylinder for receiving a canister which holds a plurality of shaped solid sanitizing elements in the form of pellets, tablets or the like. These elements may be any composition which will sanitize water such as, for example, calcium hypochlorite, bromo-chloro hydan Toin chloro-isocyanurates. The bottom wall and lower end of the canister sidewall are perforated and the lower end portion of the canister is located within the upper portion of an open top inlet or erosion reservoir. Water enters the lower end of the erosion reservoir through an inlet opening in the form of a jet and passes upwardly to contact the solid sanitizing elements in the lower end portion of the canister to gradually erode and dissolve the solid sanitizing elements in the lower end portion of the canister. As the lowermost sanitizing elements gradually erode, they are replaced by sanitizing elements which progressively move downwardly to the lower end portion of the canister by gravity. Because of the geometry of the weir formed by the wall of the erosion reservoir and the location of the lower end of the canister relative to the rim of the weir, there is constant contact between water and only those sanitizing elements in the lower end portion of the canister. Hence, a constant erosion of the bottom elements occurs, and the amount of chemical supplied to the water passing through the feeder is controlled by varying the inlet flow rate of the water which impinges upon the elements in the lower end portion of the canister. As the lowermost elements erode and dissolve, the elements located above them drop by gravity to replace them and are exposed to the water. This continues until all of the elements in the canister have been consumed.

The water that passes outwardly over the rim of the weir flows into an outlet or collection reservoir of the feeder and is returned to the water circulation system from an outlet located, for example, at the bottom of the collection reservoir. The water level in the collection reservoir is always maintained at a level below the rim of the weir in order to insure that the contact area between the lowermost elements in the canister and the inlet water remains constant. This is important because it insures that the upper elements in the canister remain relatively dry and results in controlling the rate of erosion and dissolution by the water flow rate only.

The chemical feeder may automatically and continuously dispense calcium hypochlorite for swimming pool water sanitation. In this regard, the feeder be constructed to utilize solid sanitizing tablets such as the calcium hypochlorite tablets described in U.S. Pat. No. 4,865,760 which is owned by the assignee of the instant application. The invention provides a flow-through chemical feeder for off-line or in-line installation in a closed system or an atmospheric system. The maintenance of the water level by the inlet water flow rate is possible because the feeder operates at a negative pressure since the outlet is in flow connection with the suction side of the pump in a closed system. Alternatively, the feeder could be installed in an atmospheric system and float valves or a gravity return could be used to maintain the water level in the feeder.

The feeder is designed to use either disposable or refillable canisters containing a plurality of solid water sanitizing elements sufficient to continuously sanitize water for a desired period. The feeder works on the principle of constant contact between the solid sanitizing elements and the inlet water through perforations in the bottom wall and the sidewall of the canister. The amount of chlorine, sanitizing agent, e.g., delivered to the water is varied by controlling the flow rate of the inlet water which impinges upon and erodes and dissolves the lowermost calcium hypochlorite elements.

The feeder may be easily retrofitted to existing swimming pool circulating systems and provides continuous chlorine feed to the pool for an extended period of unattended operation. For example, a 40,000 gallon swimming pool may be treated for a week or more by a single feeder without the addition of solid sanitizing elements to the feeder. The feeder has an adjustable, delivery rate and, depending upon the size of the canister and chemical composition of the sanitizing elements, can provide a continuous chlorine feed to pools of various capacities for a prolonged period. Several feeders may be used for large pools.

The features which characterize the invention are pointed out with particularity in the claims annexed to and forming a part of this disclosure. For a better understanding of the invention, its operating advantages and the specific objects attained by its use, reference should be had to the accompanying drawings and the description thereof in which a preferred embodiment of the invention is illustrated and described. Like reference characters describe like parts throughout the drawings.

BRIEF DESCRIPTION OF THE DRAWINGS

FIG. 1 is a vertical section through the chemical feeder according to the invention;

FIG. 2 is an elevation of the exterior of the feeder according to the invention.

DESCRIPTION OF THE PREFERRED EMBODIMENT

Figure 3:
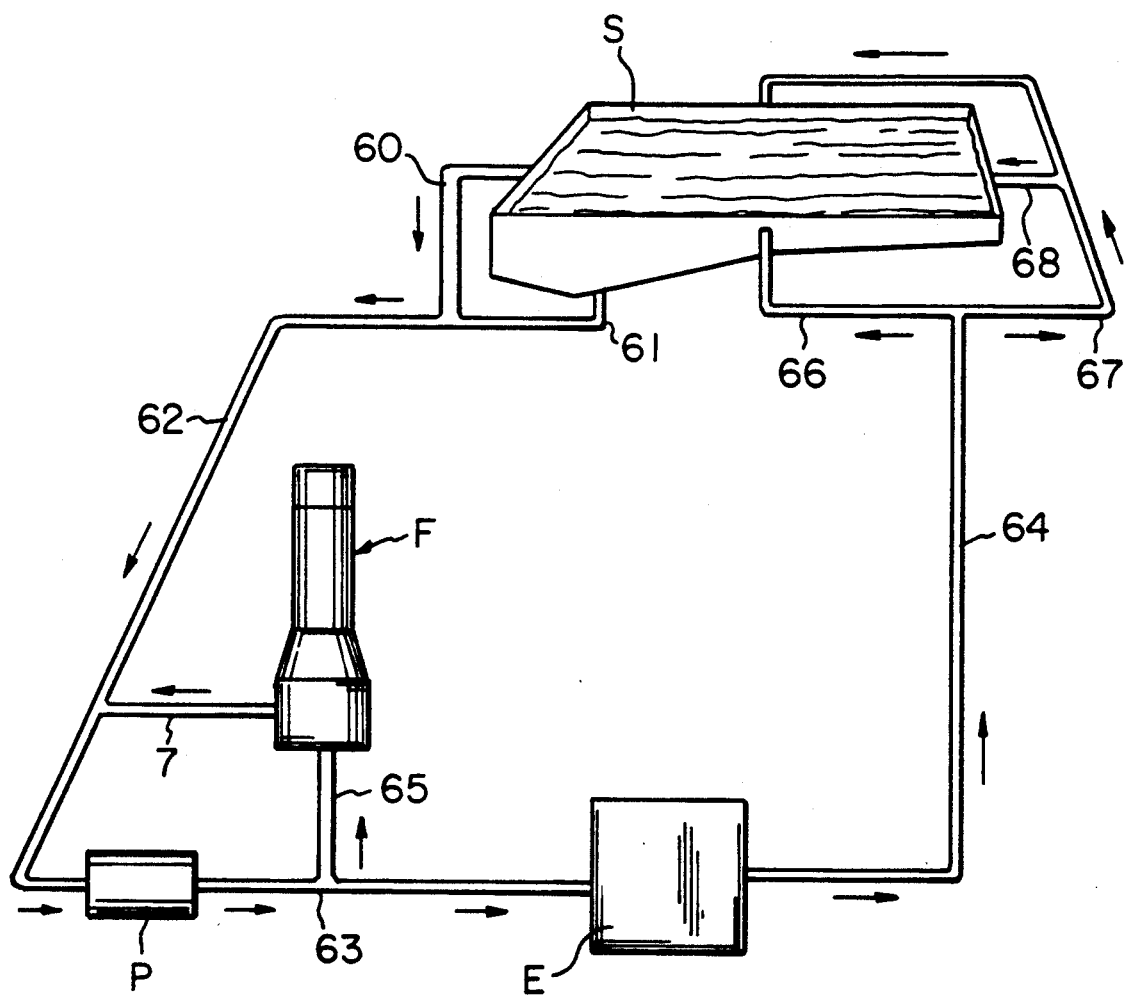
FIG. 3 is a schematic flow diagram showing a feeder installed in a closed water circulation system.

As shown in FIG. 1 of the drawings, the feeder F includes a base 1 having web-like legs 2 supporting a cup-shaped bottom member 3 which forms the lower portion of an outlet or collection reservoir 4. A cylindrical member 5 forms a portion of the sidewall of collection reservoir 4 and has its lower edge attached to the upper portion of the sidewall of cup-shaped member 3 of collection reservoir 4 by an appropriate adhesive. An elbow 6 is connected to an outlet opening located in the central portion of the bottom of collection reservoir 4 to remove chemically treated water from the feeder and supply it to a conduit 7 for eventual passage to the suction side of pump P, as shown in FIG. 3 of the drawings. The upper end of cylindrical member 5 is surrounded by a downwardly extending flange 10 of an inverted cup-shaped member 11 and is attached to flange 5 by an appropriate adhesive. Member 11 has an enlarged central opening 12 formed in its top wall. The opening 12 receives the lower end of an elongated tube or cylinder 20 which surrounds a portion of the length of an elongated canister 30. The canister contains a plurality of individual solid chemical sanitizing elements T. In FIG. 1 of the drawings, the solid sanitizing elements are shown as calcium hypochlorite tablets which are stacked along the length of canister 30. The bottom wall of canister 30 is perforated and a plurality of openings 31 are spaced around the circumference of the sidewall of the lower end portion of the canister immediately adjacent to the perforated bottom wall.

The lower end of cylinder 20 extends through opening 12 in member 11 and is fixed to member 11 by an appropriate adhesive. The water surface of the upper end 22 of cylinder 20 is surrounded by a downwardly extending flange 23 on a connector 24. The flange 23 is attached to the cylinder wall by an appropriate adhesive. An O-ring collar 25 is integrally formed with connector 24 and an O-ring 26 is located in an annular groove in O-ring collar 25. The upper end of connector 24 above O-ring collar 25 is formed with external threads 27. A cap 40 having internal threads 41 on the lower portion of sidewall 42 is threaded onto the external threads 27 of connector 24 to fix cap 40 on connector 24 and close the upper end of cylinder 20. The lower edge of cap 40 compresses O-ring 26 when the cap is in place and this creates an airtight cavity in the upper end portion of cylinder 20.

An open top cup-shaped member 44 is located within collection reservoir 4 to form inlet or erosion reservoir 45. The exterior surface of the upper end of canister 30 is formed with an outwardly extending annular rib 32 which rests on the upper annular edge of connector 24 when the canister is in position in cylinder 20. This arrangement positions the lower end portion of canister 30 within the open top of an erosion reservoir 45 to generally align a portion of openings 31 in the lower end portion of canister 30 with the rim 50 of the sidewall of reservoir 45. The canister can be supported in cylinder 20 by other mechanical arrangements so long as the lower end portion with openings 31 is located in the upper end of erosion reservoir 45. For example, the canister could be suspended from the inner surface of the top of cap 40.

An inlet opening 46 is located in the base of cup-shaped member 44 and an elbow 47 is in flow communication with the inlet opening. An inlet conduit 48 extends through the sidewall of collection reservoir 4 and an inlet flow control valve 49 is mounted in the inlet conduit to control the flow rate of water supplied to erosion reservoir 45. The rim 50 of the sidewall of cup-shaped member 44 is located in substantially the same horizontal plane as the upper edges of openings 31 formed in the lower end portion of canister 30 when the canister is in position in cylinder 20. The sidewall of member 44 functions as a weir when water is supplied to erosion reservoir 45. As will be understood by those skilled in the art, elbow 47 can be replaced by a gravity control connection which has a high point close to, but preferably above, rim 50 so that when the pump is not operating, the calcium hypochlorite solution in the feeder flows out of reservoir 45 into the gravity control connection and does not contact valve 49 and therefore does not damage valve 49.

In operation inlet water in the form of a jet contacts the solid elements in the lower end portion of the canister through perforations in the bottom wall and openings 31 in the sidewall of the lower end portion of the canister and the erosion rate of the elements as well as the surface area contacted by the water and, hence, the amount of chemicals provided to the water, is controlled by the flow rate of the inlet water through valve 49. Thus, when the chemical content of the water is to be increased, valve 49 is opened to increase the water flow rate into erosion reservoir 45 of the feeder and thereby erode the solid sanitizing elements T at a greater rate. Since only the lowermost solid sanitizing elements are contacted by the inlet water, control of the amount of chemicals added to the water is maintained.

The inlet water impinges on the surfaces of the sanitizing elements in the lower end portion of the canister through the perforated bottom wall of the canister and through openings 31 adjacent to the bottom wall of the canister. The lowermost sanitizing elements erode and dissolve and when the lowermost elements are consumed, they are replaced by the elements located immediately above them in the canister. The inlet chemically treated water flows over the rim 50 of the weir formed by the sidewall of member 44 into collection reservoir 4 for return to the water circulation system on the suction side of pump P. This feeder design maintains a constant water level in the lower end portion of the canister and allows erosion and dissolution of the lowermost elements to occur by the impingement of the inlet water on the surfaces of the solid sanitizing elements in the lower end portion of the canister.

FIG. 3 of the drawings shows a closed system wherein water is discharged from a swimming pool S from the skimmer outlet through conduit 60 and from the bottom drain through conduit 61. Both of these conduits are in flow connection with an outlet conduit 62 which is connected with the suction side of pump P. The water flows through the pump to a conduit 63 from which a portion of the water is bled off and passes through conduit 65 to feeder F, which is in a parallel relationship to the pump, for chemical treatment. The treated water discharged from feeder F flows through conduit 7 to rejoin the water in conduit 62. Chemically treated water mixed with pool water is discharged from pump P and flows through conduit 63 to a filter E and the water discharged from the filter flows through a conduit 64 to a plurality of branch conduits 66, 67, 68 which supply chemically treated water to the swimming pool inlets. The water passing from the pressure side of pump P which is recirculated through conduit 65 to feeder F is of no consequence as the amount of recirculated water is minimal and has no effect on the operation of the overall system. As will be understood by those skilled in the art, the schematic flow diagram of a closed system shown in FIG. 3 of the drawings is representative only and the feeder of the invention can be installed in other water circulation systems.

The feeder is relatively inexpensive to construct and maintain since it has no moving parts other than inlet valve 49 which can be an SG-12 valve manufactured by Industrial Specialty Manufacturing, Inc. located in Englewood, Colo. The feeder may be made from any material such as, for example, polyethylene, EPDM, ABS, fiberglass reinforced resins, polysryrene, polypropylene or polyvinyl chloride (PVC) which is generally resistant to calcium hypochlorite and other water sanitizing chemicals. Other materials such as stainless steel can also be used, but the use of such material would result in a substantial increase in cost. Parts of the feeder may be made by rotation molding in which case cylinder 20, erosion reservoir 45 and collection reservoir 4 will be molded as a unitary structure and the collection reservoir will be an annulus. Injection molding can also be used, but it is more expensive than rotation molding.

When the feeder is installed in a closed system as shown in FIG. 3 of the drawings, the treated water is supplied to the suction side of pump P. Hence, a negative gauge pressure is present in the feeder which prevents air dissolution in the water in the lower end portion of canister 30 and precludes the water level from rising in cylinder 20 and wetting the solid sanitizing elements other than those in the lower end portion of canister 30. As explained above, this is an important aspect of the invention since it permits control of the dissolution rate of the solid sanitizing elements in accordance with the inlet water flow rate through inlet valve 49.

The foregoing describes a preferred embodiment of the invention and is given by way of example only. The invention is not limited to any of the specific features described herein, but includes all such variations thereof within the scope of the appended claims.

We claim:

1. A chemical feeder including a base, a collection reservoir having a closed upper end and a closed lower end supported on said base, an elongated cylinder supported in said upper end member of said collection reservoir and extending upwardly therefrom, a cup-shaped member having an annular side wall that forms an annular rim, said cup-shaped member forming an open top erosion reservoir located within and substantially concentric with said collection reservoir, outlet means for removing liquid from said collection reservoir, inlet means for supplying liquid to said erosion reservoir, control means connected to said inlet means for controlling the flow rate of liquid supplied to said erosion reservoir, an elongated canister adapted to contain solid dry chemical sanitizing element located with said cylinder, means for supporting said canister within said cylinder with the lower end portion of said canister located in the open top of said erosion reservoir, a plurality of openings located in the lower end portion of said canister whereby said chemical sanitizing element located in the lower end portion of said canister may be contacted by liquid charged to said erosion reservoir to erode and dissolve said solid sanitizing chemical in the lower end portion of said canister whereby liquid containing sanitizing chemical flows over the rim of said open top erosion reservoir into said collection reservoir and out of said outlet means in said collection reservoir.

2. A chemical feeder as set forth in claim 1, wherein said collection reservoir is cylindrical and consists of a first cup-shaped bottom member, an intermediate member and an inverted cup-shaped top member having a substantially centrally located opening therethrough to receive said elongated cylinder.

3. A chemical feeder as set forth in claim 1, wherein said feeder is made from one of polyethylene, polypropylene or polyvinyl chloride.

4. A chemical feeder as set forth in claim 1, wherein said erosion reservoir has an annular sidewall forming a weir having an annular rim and a number of said plurality of openings in the lower end portion of said canister are located in the sidewall of said canister below a plane including said rim whereby liquid flowing upwardly through said erosion reservoir contacts the solid dry chemical sanitizing elements in the lower end portion of said canister to erode and dissolve said solid chemical elements and flows over said rim of said weir into said collection reservoir.

5. A chemical feeder as set forth in claim 4, wherein a number of said plurality of openings in the lower end portion of said canister are located in the bottom wall of said canister.

6. A chemical feeder as set forth in claim 1, including cylindrical connector means at the upper end of said cylinder for supporting said canister in said cylinder, said connector means having an O-ring collar formed thereon and an O-ring located within said collar, external threads formed on the upper end of said connector mean, a cap having a top wall and a depending sidewall and internal threads formed on said sidewall adapted to screw onto said external threads on said connector means to hold said cap in place on the upper end of said cylinder.

7. A chemical feeder as set forth in claim 6, wherein the edge of said sidewall of said cap compresses said O-ring when said internal threads formed on said cap are screwed onto said external threads formed on said connector means to prevent air from entering said cylinder.

8. A chemical feeder as set forth in claim 7, including means on said canister for mounting said canister in said cylinder with the lower end portion of said canister located in said erosion reservoir.

9. A chemical feeder as set forth in claim 7, wherein the outer surface of said canister is formed with an outwardly extending rib adjacent the upper end of said canister adapted to contact the upper edge of said cylinder to support said canister within said feeder.

10. A chemical feeder having a collection reservoir with an upper end and a lower end, an elongated tube supported on said collection reservoir and extending upwardly therefrom, an erosion reservoir having a side wall ending in a rim, said erosion reservoir being located within said collection reservoir, outlet means for removing liquid from said collection reservoir, inlet means for supplying and directing liquid upwardly from the bottom of said erosion reservoir, control means for controlling the rate of flow of liquid into said erosion reservoir, a canister having an upper end and a lower end portion adapted to contain solid dry chemical sanitizing element supported within said elongated tube with the lower end portion located at least partly within said erosion reservoir, a plurality of openings located in the lower end portion of said canister whereby solid chemical sanitizing element located in the lower end portion of said canister is contacted by liquid directed into said erosion reservoir to erode and dissolve the solid chemical sanitizing element whereby liquid containing said chemical sanitizing element flows over the rim of said erosion reservoir into said collection reservoir and out of said outlet means of said collection reservoir.

11. A chemical feeder as set forth in claim 10, wherein said collection reservoir is cylindrical and is substantially concentric with said erosion reservoir.

12. A chemical feeder as set forth in claim 10, wherein said erosion reservoir has an open top and an annular sidewall with a rim radially spaced from said lower end portion of said canister whereby water flowing through said erosion reservoir contacts the solid chemical sanitizing element in the lower end portion of said canister to erode and dissolve said solid element and flows over said rim into said collection reservoir.

13. A chemical feeder as set forth in claim 10, wherein the dry solid chemical sanitizing element in said canister is calcium hypochlorite tablets.

14. A chemical feeder as set forth in claim 10, wherein said feeder is made from one of polyethylene, polypropylene or polyvinyl chloride.

15. A chemical feeder as set forth in claim 10, including means on the upper end of said elongated tube for supporting a cap for closing the upper end of said tube, said means having external threads and a cap having internal threads adapted to screw onto said external threads to hold said cap in place.

16. A chemical feeder as set forth in claim 15, including sealing means for said cap to provide an airtight seal at the upper end of said tube.

17. A chemical feeder as set forth in claim 15, including means on said canister for supporting said canister in said tube.

18. A water circulation system including a water supply tank, a pump in a fluid communication with said tank, said pump having a suction side and a pressure side, a filter in fluid communication with said pump, and a chemical feeder, said chemical feeder being in a parallel relationship with said pump in said water circulation system and having a collection reservoir, an elongated tube supported on said collection reservoir having an open top located within said collection reservoir, said erosion reservoir having a side wall ending in a rim, outlet means in said collection reservoir connected to the suction side of said pump for removing treated water from said collection reservoir and supplying it to said pump, inlet means for supplying and directing water upwardly from the bottom of said erosion reservoir, control means for controlling the water flow rate into said erosion reservoir, a canister for solid chemical sanitizing element supported within said cylinder and having a lower end portion extending into the open top of said erosion reservoir, a plurality of openings in said lower end portion of said canister to permit solid chemical sanitizing elements located in said lower end portion of said canister to be contacted by water directed into said erosion reservoir to erode and dissolve the solid chemical sanitizing element in the lower end portion of said canister whereby treated water flows out of said erosion reservoir into said collection reservoir and out of said outlet means into the suction side of the pump.

19. A system as set forth in claim 18, wherein the pressure side of said pump is connected to said filter and said filter is connected to inlets for said tank whereby water discharged from said tank passes from said pump through said control means into said erosion reservoir and is chemically treated and said chemically treated water passes through said collection reservoir into a conduit connected to the suction side of said pump to form a closed system having a negative pressure in said tube to control the water level in said tube and said canister.

20. A system as set forth in claim 18, wherein said rim of the open top of said erosion reservoir forms the upper edge of a weir and said upper edge of said weir is located adjacent to the openings in the lower end portion of said canister.

* * * * *

UNITED STATES PATENT AND TRADEMARK OFFICE
CERTIFICATE OF CORRECTION

PATENT NO. : 5,089,127

DATED : Feb. 18, 1992

INVENTOR(S) : David M. Junker et al

It is certified that error appears in the above-identified patent and that said Letters Patent is hereby corrected as shown below:

Claim 18, column 8, line 20, after "reservoir" insert --and extending upwardly therefrom, an erosion reservoir--.

Signed and Sealed this

Twenty-first Day of September, 1993

Attest:

BRUCE LEHMAN

Attesting Officer     Commissioner of Patents and Trademarks